Figure 1:
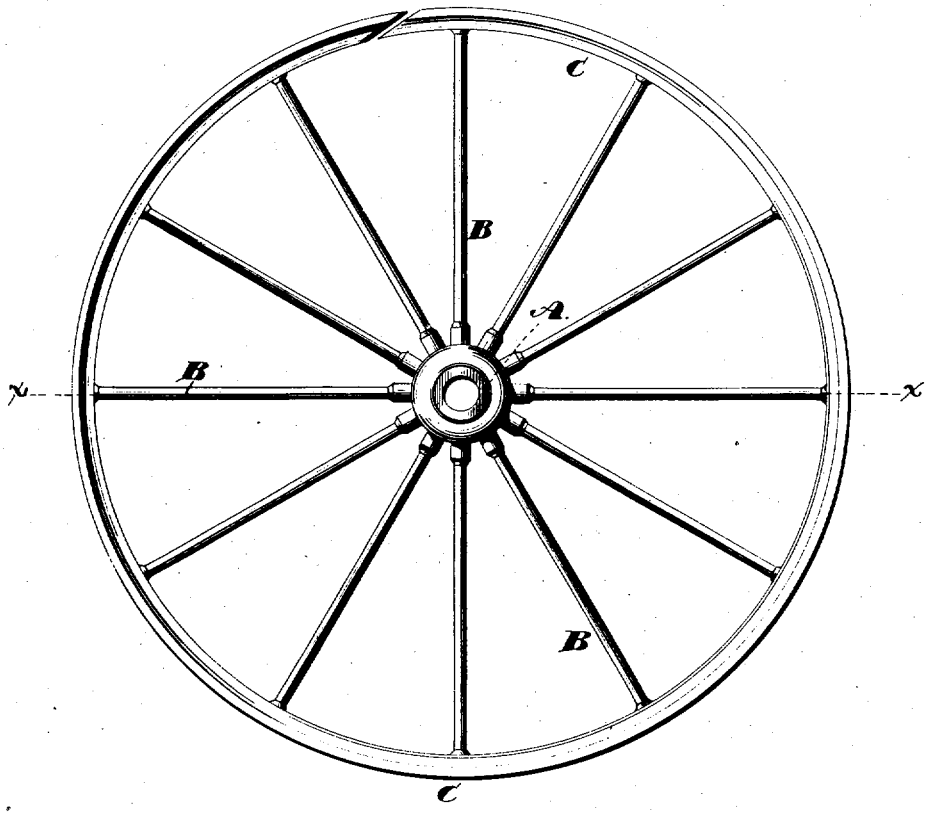

J. R. LITTLE.

Assignor, by direct and mesne assignments, to the QUINCY METAL WHEEL COMPANY.

MANUFACTURE OF METAL WHEELS.

No. 10,843. Reissued June 7, 1887.

Witnesses:
Chas. J. Williamson.
Jas. E. Hutchinson.

Inventor:
Jas. R. Little, by
Prindle & Russell, his Attys.

J. R. LITTLE.

Assignor, by direct and mesne assignments, to the QUINCY METAL WHEEL COMPANY.

MANUFACTURE OF METAL WHEELS.

No. 10,843. Reissued June 7, 1887.

Witnesses:
Chas J Williamson
Jas E Hutchinson

Inventor:
Jas. R. Little, by
Prindle & Russell, his Attys.

UNITED STATES PATENT OFFICE.

JAMES R. LITTLE, OF QUINCY, ILLINOIS, ASSIGNOR, BY DIRECT AND MESNE ASSIGNMENTS, TO THE QUINCY METAL WHEEL COMPANY, OF SAME PLACE.

MANUFACTURE OF METAL WHEELS.

SPECIFICATION forming part of Reissued Letters Patent No. 10,843, dated June 7, 1887.

Original No. 273,746, dated March 13, 1883. Application for reissue filed February 15, 1886. Serial No. 192,018.

DIVISION B.

*To all whom it may concern:*

Be it known that I, JAMES R. LITTLE, of Quincy, in the county of Adams, and in the State of Illinois, did invent certain new and useful improvements in the manufacture of metal wheels, for which Letters Patent No. 273,746 were issued to me upon the 13th day of March, 1883, which Letters Patent have been found to be inoperative and invalid, in that they do not cover the invention set forth in the specification and shown in the drawings which were filed by me in the Patent Office upon the 31st day of October, 1882, preparatory to the obtaining of the said Letters Patent. Now, therefore, being desirous of reissuing the said Letters Patent, I have prepared, and do hereby declare the following to be, a full, clear, and exact description of the said improvements, reference being had to the accompanying drawings, in which—

Figure 2:
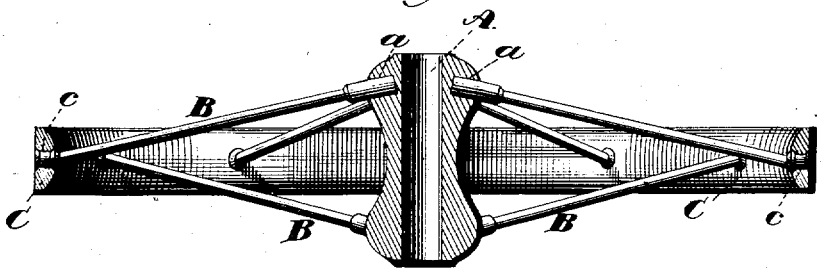
Figure 3:
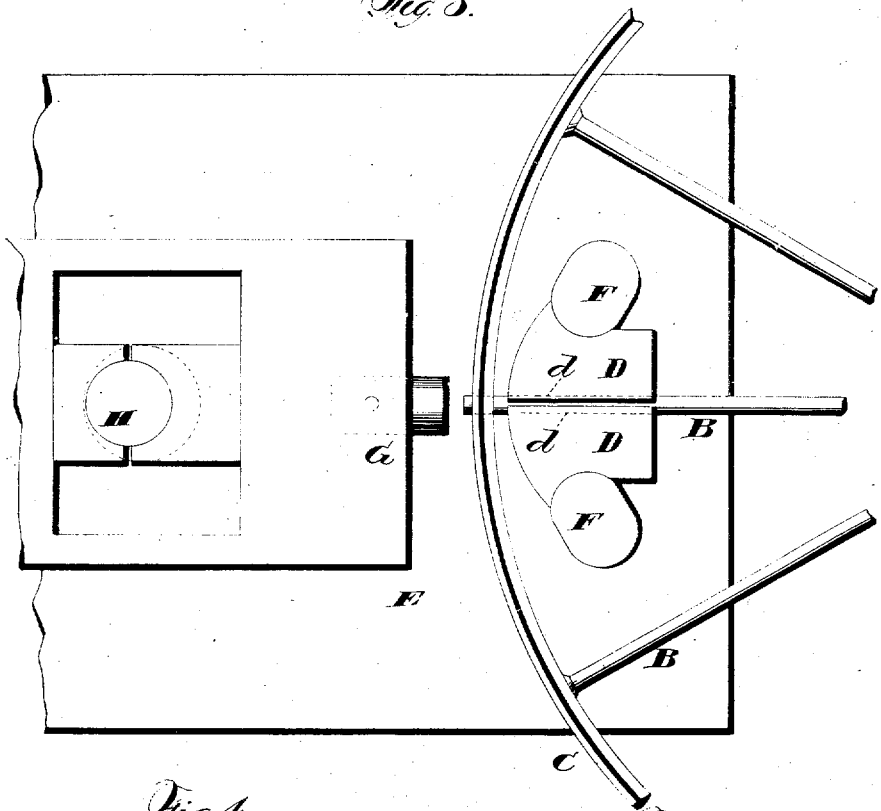
Figure 4:
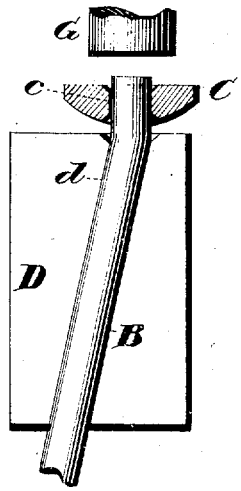
Figure 5:
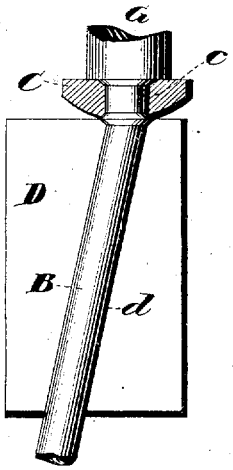

Figure 1 is a side elevation of a wheel embodying my invention, complete with exception of welding together the ends of the rim. Fig. 2 is a section of the same upon line *x x* of Fig. 1. Fig. 3 is a plan view of the mechanism employed for securing the rim to the spokes, a portion of a wheel being shown in position therein. Fig. 4 is a side elevation of one of the spokes and a cross-section of the rim at the point of their intersection, said parts being in position within the mechanism used for uniting them, and Fig. 5 is a like view of the same after having been operated upon by said mechanism.

Letters of like name and kind refer to similar parts in each of the figures.

My invention is designed for use in the construction of metal wheels; and it consists in a mechanism in which is combined the following elements, to wit: clamping devices that are adapted to grasp a wheel-spoke near the inner periphery of the wheel-rim and firmly hold said spoke against longitudinal movement, and mechanism which is adapted to impinge upon the projecting end of said spoke and to compress the same longitudinally between said end and the point where it is grasped by said clamping devices, said parts being arranged to operate in the order named, substantially as and for the purpose hereinafter specified.

My mechanism is designed for use in the construction of a metal wheel, in which a hub, A, is provided with a series of radial mortises, *a*, into each of which is secured the inner end of a spoke, B, that is constructed from a rod of metal. Upon the outer ends of the spokes B is placed a metal rim, C, which has radial mortises *c*, that have each a larger diameter than the body of its spoke, and within which the end of such spoke is secured by a longitudinal compression that expands the same until it closely fills said mortise, and is enlarged at each end of the same. In thus combining the spokes and rim I employ mechanism which in part consists of two jaws, D and D, that are provided within their contiguous faces with coinciding grooves, *d* and *d*, which correspond with the shape of and have a slightly smaller diameter than a spoke, B, so that when the latter is placed within said grooves and said jaws forced together said spoke will be clamped by and firmly held between the same. Said jaws D and D are arranged upon a suitable supporting-frame, E, and are moved toward each other by cams F or other like means.

The spoke B being clamped between the jaws D and D, a short distance inside of the rim C, a plunger, G, actuated by an eccentric, H, or other equivalent mechanism, is caused to impinge upon the projecting outer end of said spoke, and to compress the same longitudinally until, by the lateral expansion of said spoke, the mortise *c* is closely filled and said spoke is enlarged at each end of the same.

Having thus fully set forth the nature and merits of my invention, what I claim as new is—

A mechanism in which are combined the following elements, to wit: clamping devices that are adapted to grasp a wheel-spoke near the inner periphery of the wheel-rim and firmly hold said spoke against longitudinal movement, and mechanism which is adapted to impinge upon the projecting end of said spoke and to compress the same longitudinally between said end and the point where it is grasped by said clamping devices, said parts being arranged to operate in the order named, substantially as and for the purpose specified.

In testimony whereof I hereunto set my hand this 15th day of October, 1885.

JAMES R. LITTLE.

Witnesses:
CARL E. EPLER,
T. J. SEEHORN.